United States Patent [19]

Rasmussen

[11] 4,455,053
[45] Jun. 19, 1984

[54] FABRICATED HINGE TRACK SHOE

[75] Inventor: Robert Rasmussen, Rancho Palos Verdes, Calif.

[73] Assignee: Industrial Parts Depot, Torrance, Calif.

[21] Appl. No.: 343,519

[22] Filed: Jan. 28, 1982

[51] Int. Cl.³ .............................................. B62D 55/20
[52] U.S. Cl. ......................................... 305/53; 305/57
[58] Field of Search ............................... 305/53, 54, 57

[56] References Cited

U.S. PATENT DOCUMENTS

| | | | |
|---|---|---|---|
| 1,614,531 | 1/1927 | Menningen | 305/53 |
| 1,759,049 | 5/1930 | Fykse | 305/53 X |
| 2,321,202 | 6/1943 | Heine | 305/57 |
| 2,370,667 | 3/1945 | Johnson | 305/35 R X |
| 4,244,532 | 1/1981 | Kroening et al. | 228/182 X |

FOREIGN PATENT DOCUMENTS

| | | | |
|---|---|---|---|
| 1,208,735 | 2/1960 | France | 305/53 |
| 594625 | 11/1947 | United Kingdom | 305/53 |

*Primary Examiner*—David A. Scherbel
*Attorney, Agent, or Firm*—Beehler, Pavitt, Siegemund, Jagger & Martella

[57] ABSTRACT

A low-cost track shoe for tracked vehicles is fabricated from sheet metal stock or scrap pieces according to three alternate shoe structure disclosed herein. The shoe structures of this invention include a plurality of linkage members welded between a bottom plate and a top plate in such a manner as to form unitary assemblies which can be interconnected by means of hinge joints to form any desired track length. The various shoe structures of this invention teach different arrangements of the linkage members and different linkage member structures for obtaining track shoes readily interchangeable with conventional track shoes manufactured by sandcasting methods of the prior art.

9 Claims, 7 Drawing Figures

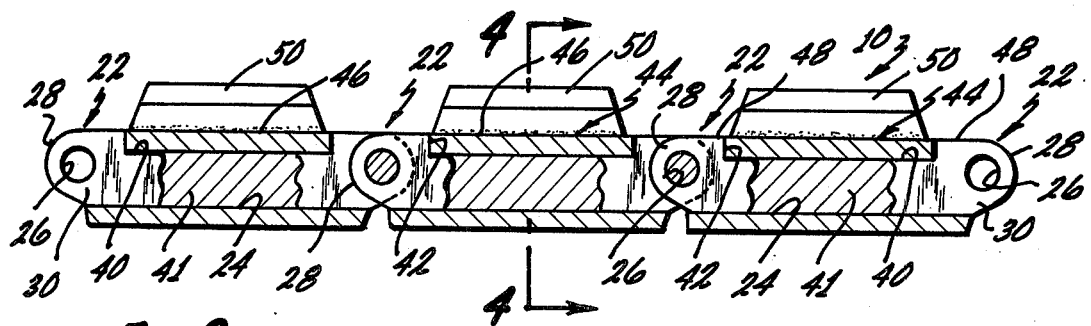
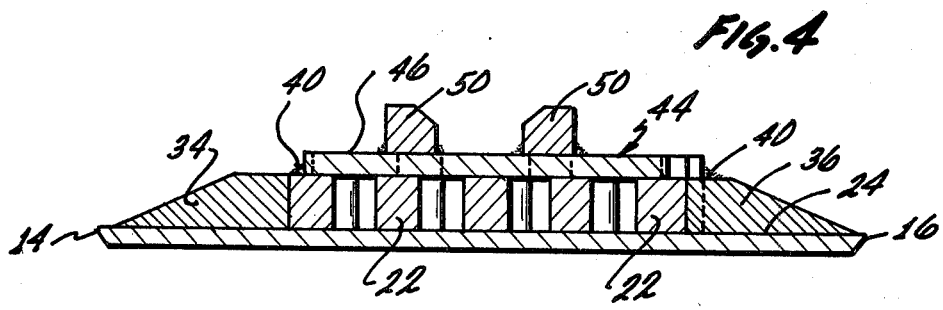
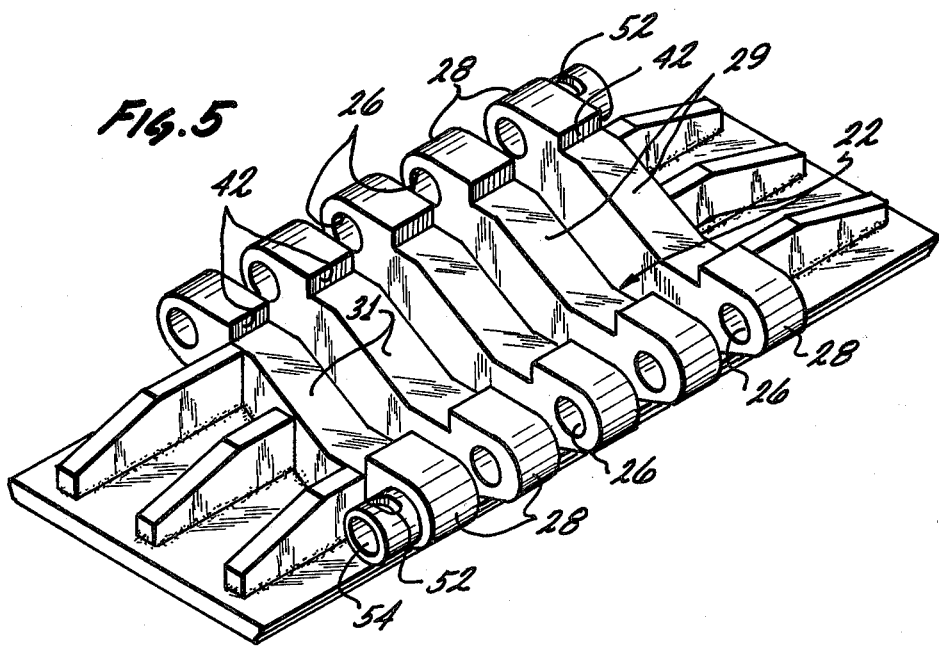

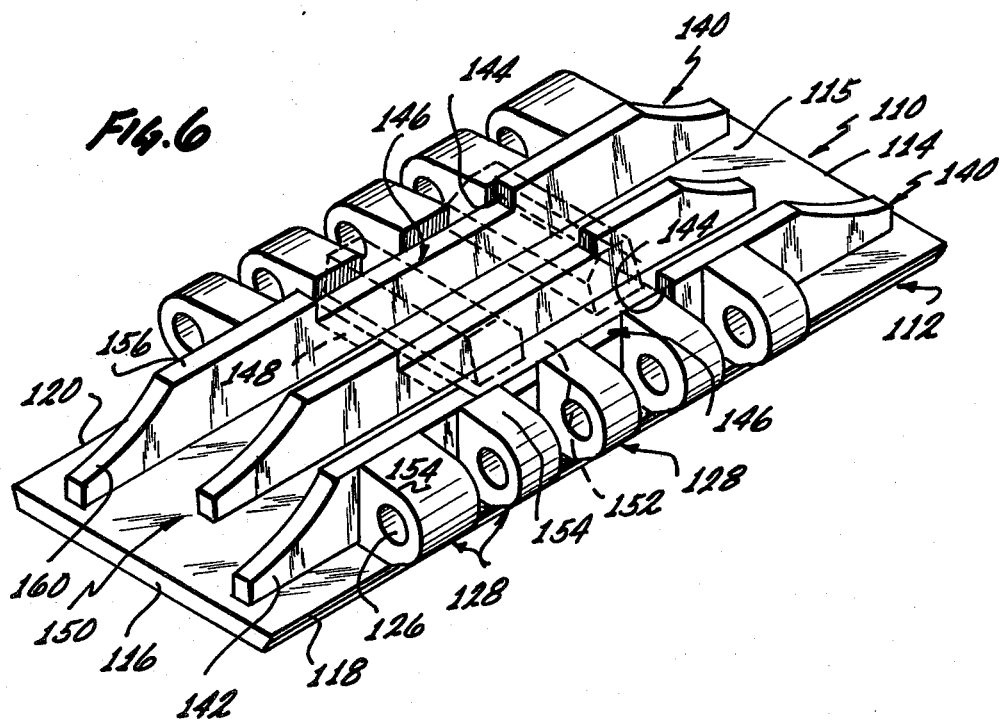
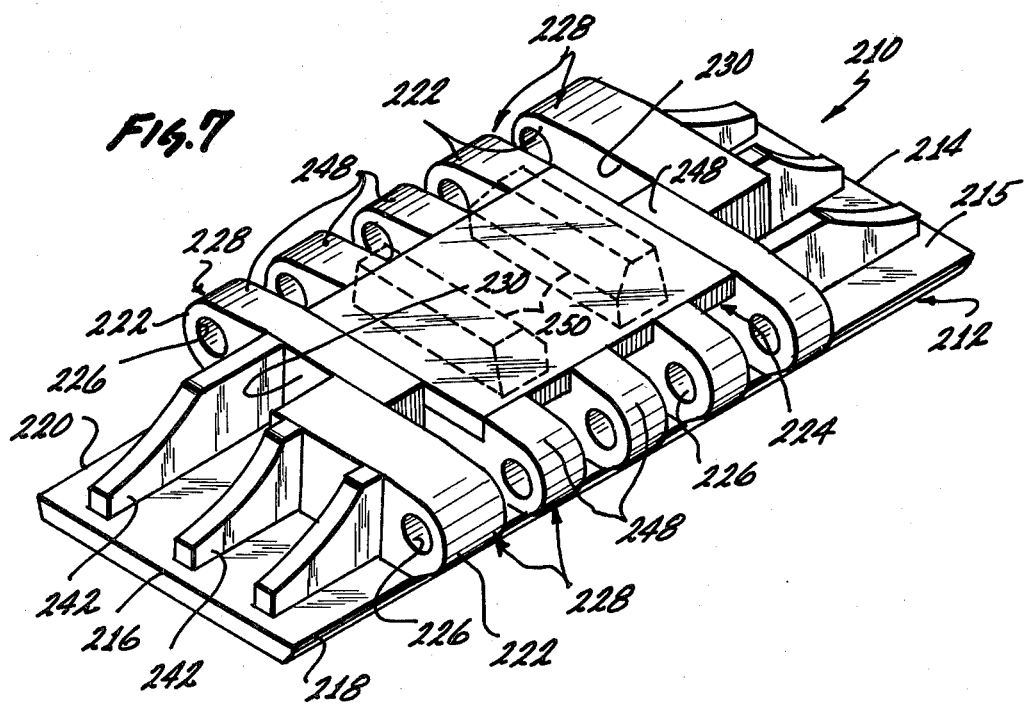

FABRICATED HINGE TRACK SHOE

BACKGROUND OF THE INVENTION

1. Field of the Invention

This invention relates generally to shoes used in tracked vehicles such as crawler shovels and cranes, bulldozers and similar industrial and construction equipment and is more particularly directed at a shoe structure suitable for fabrication from sheet metal.

2. State of the Prior Art

The track shoes of the prior art were formed in a single piece by sandcasting methods using manganese or alloy steel. The individual track shoes were then joined by means of hinge joints between adjacent track shoes in a manner well known in the art. It was found that the manganese or alloy steel wears in use such that the bores through which the hinge pin extends become enlarged in diameter through abrasion and result in a loose joint between adjacent track shoes. In addition, the shear strength of the cast manganese steel is comparatively low and the shoes can fracture due to torsional forces acting on the shoes and hinge joints as the track travels over uneven, rocky terrain. It is therefore desirable to manufacture such track shoes of a harder metal which can be machined to a greater precision to make smooth, snugly fitting bores and thus product a better, smoother hinge joint between the track shoes that make up the flexible vehicle track.

It often occurs in use that the individual track shoes, as they travel over uneven terrain, are subject to torsional forces which cause the bores of the shoes through which pass the retaining pins linking adjacent shoes to become off-round and enlarged so that the retaining pin no longer fits snugly and the shoes become loosely attached to each other. The practice is to bore the shoes to a larger diameter so that the bores once again become truly cylindrical and properly aligned and then resort to an over-sized pin of greater diameter to snugly fit within the enlarged bores. In the alternative, sleeve bushings may be inserted into the enlarged bores and the original retaining pin reused. It has been found that precision drilling of out-of-round bores in manganese steel cast track shoes is difficult and costly. By using other types of steel more susceptible to precision drilling, it would be easier to overhaul worn track shoes by re-drilling the pin bores of the hinge pin and could make it possible to use bearings in the bores to minimize the wear between the hinge pin and bore walls.

SUMMARY OF THE INVENTION

The present invention solves the difficulties of the prior art by providing track shoe structures which are suitable for low cost fabrication from sheet metal, this enabling the use of harder steel alloys than have been possible in the past. Three alternate structures are disclosed herein to produce track shoes substantially equivalent and interchangeable with the sandcast shoes of the prior art, while at the same time reducing the cost of each track shoe by up to forty percent over the cost of sandcast units. This cost reduction is significant since a typical tracked vehicle uses 60 to 80 track shoes, 30 to 40 on each side of the vehicle.

In additon, the shoes assembled from sheet metal can be heat-treated after assembly to obtain greater hardness and resistance to wear, and can also be precision-drilled to form precisely aligned bores for receiving the hinge pin, thus resulting in smoother hinge action and longer wear. The units of this invention also have a higher shear strength than the sandcast shoes of the prior art, thus resulting in a lower failure rate and consequently lower operating costs, in addition to the lower manufacturing cost. The track shoes of this invention can be used either as original equipment or as replacement parts.

The various component parts for the track shoe structures of this invention are preferably flame-cut from sheet metal stock to the required shapes and are then welded together into a unitary assembly which can be directly substituted for shoes of similar dimensions which were made by the previous sandcasting methods.

Since the fabricated track shoes of the present invention are manufactured from a number of relatively small component parts, it is possible to use scrap metal for the manufacture of these component parts. Thus, remnant pieces of sheet metal stock or bar stock which would otherwise be discarded or sold for scrap can be put to a higher economic use in this invention. The parts can be cut from stock as by automated flame-cutting methods and then welded into a permanent structure.

BRIEF DESCRIPTION OF THE DRAWINGS

FIG. 3 is a cross section taken along the line 3—3 of FIG. 2;

FIG. 4 is a transverse cross section taken along the line 4—4 of FIG. 2;

FIG. 5 is a perspective view of the first embodiment of FIG. 1 with the top plate removed to expose the parallel array of linkage members attached to the bottom plate;

FIG. 6 is a perspective view of a second embodiment of the present invention shown partially in dotted lines only for clarity and ease of understanding;

FIG. 7 is a perspective view of a third embodiment of the present, also partially drawn in phantom lining for clarity only.

DETAILED DESCRIPTION OF THE INVENTION

Figure 1:
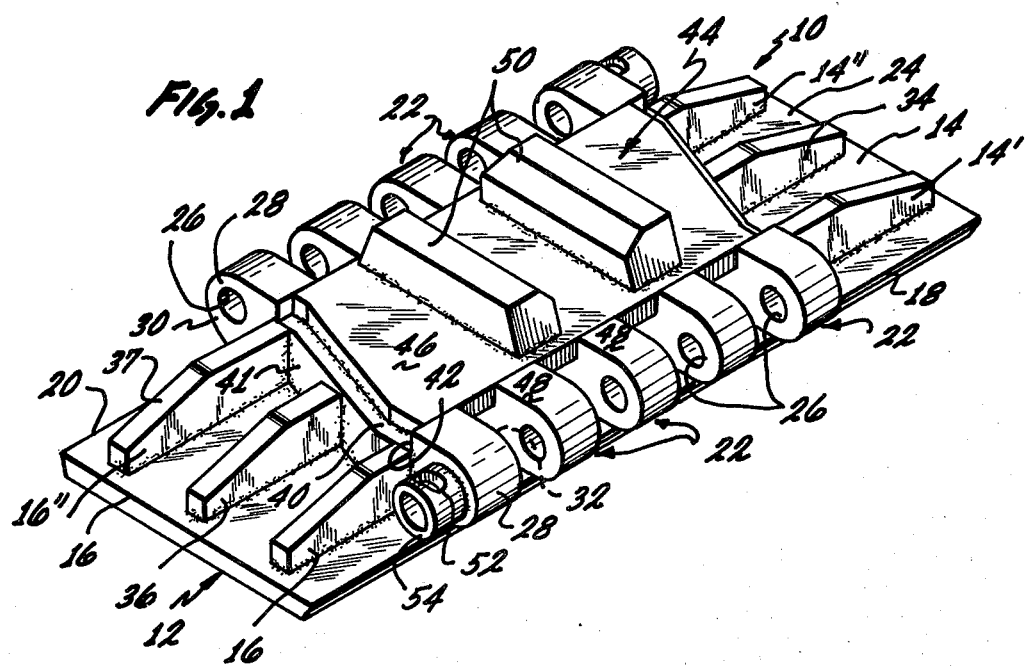
FIG. 1 is a perspective view of a first embodiment of the fabricated shoe of the present invention.

With reference to the first embodiment illustrated in FIG. 1, a fabricated track shoe 10 comprises a bottom or base plate 12 of generally rectangular configuration and having two ends 14 and 16, and a pair of long parallel side edges 18 and 20 extending between the ends. A plurality of elongated linkage members 22 are affixed transversely to the upper surface 24 of the base plate, each linkage member 22 being somewhat longer than the width of the base plate such that each linkage member has end portions 24 extending from each edge 18 and 20 of the base plate. The linkage members 24 are preferably of rectangular cross section and formed each in a single unitary link. Five such linkage members 22 are affixed to the base plate in a parallel array, as is best seen in FIG. 5. The linkage members are of uniform width along their length and are substantially identical to one another.

Figure 2:
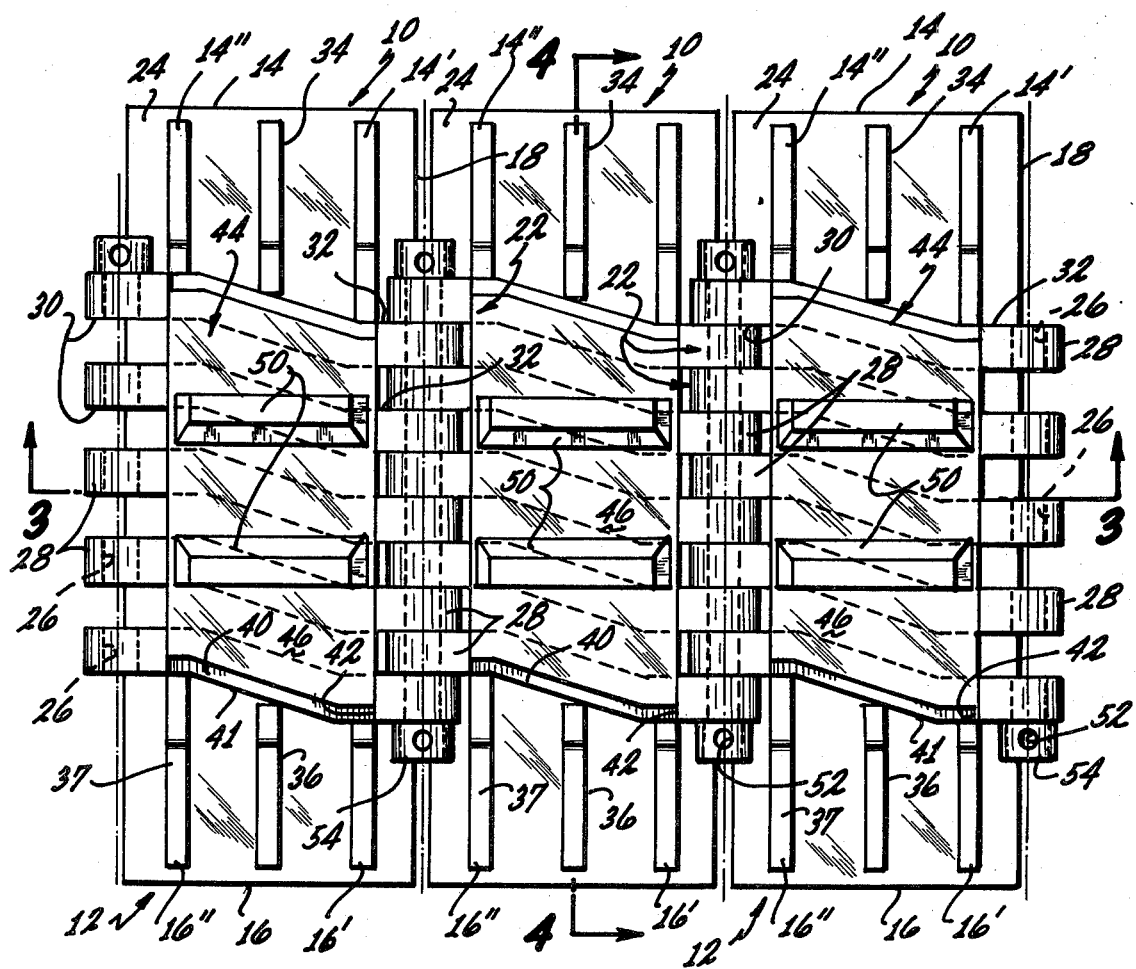
FIG. 2 is a top plan view of three track shoes such as shown in FIG. 1 linked to make a length of track.

The linkage members 22 are made from initially straight flat stock, either sheet metal or bar stock, which is deformed to make a pair of end sections 28 parallel to each other, connected by an intermediate, preferably straight section 29 angling between the parallel end sections. The linkage member 22 is deformed from the flat initial configuration so as to align one pair of opposite faces of the end sections 28 of the linkage member. That is, a face 30 of one end section 28 and an opposite face 32 of the other end section 28 of the linkage member are brought into co-planar relationship. The end sections are drilled preferably prior to the deformation step to produce parallel bores 26, one bore extending the width of each end portion 28. The linkage members are affixed in the aforesaid parallel array in fixed spaced relationship such that the bores 26 on each side of the plate 12 are aligned for receiving hinge pins (not shown in FIG. 1) parallel to each of the side edges 18 and 20 of the base plate. The spacing between the end sections 28 should be wide enough to receive a similar end section from an adjacent track shoe between each pair of end sections along each side 18 and 20 of the track shoe 10, as shown in FIG. 2.

At least one pair of brace plates 34, 36 is affixed as a corner brace between the base plate surface 14 and the outside linkage members, i.e., the first and last linkage members of the parallel array. Preferably three such pairs of parallel plates 34, 35; 34', 36'; 34", 36" are affixed in this manner as shown in FIGS. 1-5. Desirably, each of the brace plates tapers downwardly along its upper edge 37 towards the respective ends 14 and 16 of the base plate.

Each linkage member 22 has a middle section 31 of reduced height bounded defining a recess 40 bounded by a pair of end walls 42 perpendicular to the base plate. The combined recesses 40 of the parallel array of linkage members define a depression dimensioned for receiving a top plate 44, also cut from flat sheet metal stock. The top plate 44 thus lies within the recesses 40 in parallel relationship with the base plate and spaced therefrom by the middle portions 31 of reduced height of the linkage members. The recesses 40 are further dimensioned in depth so that the top surface 46 of the top plate lies flush with the top surfaces 48 of the end portions 28.

A pair of guide members 50 are affixed to the top surface 46 of the top plate for engagement with a drive wheel in a track mechanism. The guide members 50 are suitably shaped for proper engagement with a particular wheel.

Assembly of the track shoe is completed by welding along all joint lines between all of the separate component parts to make a strong permanent structure.

A number of such fabricated track shoes may be assembled into any arbitrary length of track, as is known in the art, and shown in FIG. 2 by mating the end portions 28 of adjacent track shoes and securing the mated end portions by inserting a hinge pin through the aligned bores of the mated portions. The hinge pin is secured by a transverse locking pin inserted through a hole 52 formed in a short length of tubing 54 attached to one of the end portions 28 on each side of the base plate in alignment with the bores 26.

Turning to FIG. 6, a second embodiment of the invention is a track shoe 110 which includes a base plate 112 having two ends, one end 114 and one 116, and a pair of parallel opposite sides 118 and 120.

At least two parallel tranverse brace plate members 140 are affixed to the upper side 115 of the base plate, each of the transverse plates being proximate and parallel to one of the opposed side edges 118 and 120. Each of the plates 140 thus presents a side 142 towards its corresponding side edge. A number (e.g., five) of D-shaped substantially identical linkage members 128 are affixed in evenly spaced mutually parallel relationship along the side 142 of each transverse plate 140 such that the linkage members extend at least partially over the corresponding side edge of the base plate. Thus, two parallel rows of linkage members are formed, the rows being longitudinally offset such that each linkage member is in staggered non-overlapping relationship with those on the opposite side, and the spacing between the adjacent linkage members on each side is slightly greater than the width of the linkage members.

Each linkage member is D-shaped in side view, having two side faces with a bore extending therethrough, a planar rear surface for attachment to the side 142 of the transverse plate 140, and a curving frontal surface extending from the top over the forward or outer end of the linkage member down underneath to intersect the rear surface. The linkage members 128 are affixed in two rows such that the bores 126 are aligned along each of the side edges of the base plate 112 for receiving a hinge pin in the manner described in connection with the first embodiment of this invention.

The transverse brace plates 140 have formed therein a middle portion of reduced height bounded by vertical end walls 144 perpendicular to the base plate. The depth of the recess 146 in each transverse plate 140 is dimensioned for receiving the thickness of a top plate 148 which may be of rectangular configuration, such that the upper surface 152 of the top plate lies flush and contiguous with the upper surfaces 154 of the D-shaped linkage members 128 arranged along the transverse plates 140, the edges of the top plate abutting the rear of the linkage members. The height of the transverse brace plates 140 is such that they terminate in an upper edge 156 flush with the upper surface 152 of the top plate as well as flush with the upper surfaces 154 of the linkage members. A pair of drive lugs or guide members 147 are secured to the upper side of the top plate 146 as by welding. Preferably, a third transverse brace 150 is secured to the base plate 112 in parallel equidistant relationship between the two main transverse plates 140. The middle transverse plate 150 is equally recessed at the middle to receive the top plate 146.

Desirably, all of the transverse plates 140 and 150 terminate in downwardly tapering ends. The taper may be of concavely curved shape, as at 160 in FIG. 6.

Turning now to FIG. 7, a third embodiment of the invention is illustrated, wherein the fabricated track shoe 210 comprises a rectangular base plate 212 having two ends 214 and 216, respectively, and a pair of parallel opposing side edges 218 and 220. A plurality of straight elongated linkage members 228 of rectangular cross section are affixed to the upper surface 215 of the base plate in a parallel array such that the linkage members 228 are in side-by-side abutting relationship along their rear sections. Each linkage member has a forward end section extending over one side edge of the base plate. The end sections 222 of successive adjacent linkage members extend in opposite directions toward one or the other of the parallel side edges 218 and 220 such that the end sections 228 along each of the side edges are spaced by the thickness of an intermediate linkage member extending towards the opposite edge. For Thus, the space between adjacent pairs is equal to the width of the linkage member whose rear portion lies intermediate the rear portions of the pair. All the linkage members are substantially identical elements and are preferably uniform in thickness along their length.

Each linkage member is of rectangular cross section and has two parallel side surfaces which are perpendicular to the upper surface 215 of the base plate. Adjacent ones of the linkage members contact each other at their rear portions of the side surfaces 230. Extending between the side surfaces is a top surface 248, a bottom surface, and a rounded forward surface connecting uninterruptedly the top and the bottom surfaces to form a rounded forward portion or end 222 of the linkage member which extends over the side edges of the bottom plate. The forward portions 222 of the linkage members are provided with bores 226 which are in alignment on each of the sides of the base plate for receiving a hinge pin parallel to each of the side edges, for linking together track shoes in the aforedescribed manner.

The first and last pair of linkage members in the parallel array are provided with (e.g., three) corner brace plates 242 affixed between the linkage members 228 and the bottom plate 212. It will be appreciated from FIG. 7 that two of the brace plates on each end of the array are of shorter length for supporting the outermost linkage member in the array while one of the brace plates at each end is preferably longer for supporting the next adjacent linkage member 228 forming the pair.

The remaining linkage members unsupported by the brace plates 242 are of reduced heights at their rear sections to form a rectangular recess in the parallel array of linkage members. The recess is dimensioned so as to snugly receive a top plate 244 having an upper surface 246 which lies flush with the top surfaces 248 of the linkage members supported by the brace plate and also with the top surfaces 248 of the forward end portions 222 of the remaining linkage members. The recess for receiving the top plate is bounded by vertical end walls which mate with the side edges of the top plate 244 resulting in a structure wherein forces are readily transmitted through the top plate between the various linkage members and are thus distributed throughout the track shoe structure for maximum strength. As in the aforedescribed embodiments, a pair of drive lugs or guide members 250 are affixed to the upper surface 246 of the top plate for engagement with drive wheels in a track mechanism.

It will be understood in connection with all embodiments described and illustrated in this specification that different tracked vehicles may require a different configuration and number of drive lug members for engaging particularly shaped drive wheels or drive sprockets. Thus, this invention is not limited to a particular configuration of the drive lug means since this can be varied to meet particular requirements.

Some tracked vehicles have sprocketed drive wheels for driving the tracks which require drive lugs on the track shoes of a configuration which is difficult to manufacture. For such vehicles it may be desirable or more economical to cast the drive lug portion rather than fabricating the same from stock. This lug portion includes in FIG. 1 the lugs or guide members 50 and the top plate 44 which would be cast as a single unit and fitted into the recess defined by the parallel array of linkage members in the manner described above in connection with FIG. 1 at page 7. The remainder of the track shoe would be fabricated from cut stock as previously disclosed herein. Similarly, in the embodiments of the FIGS. 6 and 7, the drive lug portions comprising the top plate 146 and guide lugs 147 in FIG. 6, and top plate 224 and guide lugs 250 in FIG. 7, may likewise be cast in a single unitary piece and integrated into the manufactured track shoe structure as shown in FIGS. 6 and 7.

While three embodiments of the invention have been described and illustrated, it will be understood that other changes and substitutions may still be made by those skilled in the art. Applicant therefore intends that the scope of the invention be defined solely by the following claims.

What is claimed is:

1. A track shoe suitable for manufacture from sheet metal stock comprising:
    a bottom plate having an upper side, a lower side, two ends, and a pair of opposite edges extending between said ends;
    a plurality of elongated linkage members of uniform thickness aligned in parallel spaced relationship along said edges, each linkage member having two parallel end portions connected by an intermediate portion angling therebetween, such that the ends of said linkage members are staggered alternately on each of said edges;
    aligned bores formed in the ends of said linkage members for receiving a hinge pin adjacent to each of said edges;
    at least one pair of brace plates secured between said bottom plate and at least one pair of said linkage members for bracing said linkage members; and,
    drive lug means secured to at least one pair of said linkage members, said drive lug means including one or more guide members engageable by a drive wheel for driving said shoe in a track.

2. The track shoe of claim 1 wherein said drive lug means further comprise a plate having an upper side and a lower side, said plate being secured within a recess defined in said linkage members in parallel spaced relationship relative to the upper side of said bottom plate, and a pair of guide members secured to the upper side of said top plate.

3. A method for manufacturing a track shoe comprising the steps of:
    cutting rectangular base plate;
    cutting a plurality of elongated members of rectangular cross section and having a length greater than the width of said rectangular plate;
    bending each of said elongated members to form two parallel end sections joined by an angling intermediate section;
    affixing said elongated members to one side of said bottom plate in spaced parallel relationship to each other such that the parallel end sections extend beyond two opposed edges of the bottom plate;
    affixing at least one brace member between said bottom plate and each of the first and last of the parallel elongated members;
    drilling aligned bores through the end sections along each edge of said base plate for receiving a hinge pin therethrough; and
    affixing drive lug means to selected ones of said elongated members, said drive lug means comprising guide members shaped for driving engagement with a drive wheel of a tracked vehicle.

4. The method of claim 3 further comprising the step of forming a recess in said linkage members dimensioned to receive said drive lug means including a top plate such that the upper side of the top plate lies flush with the portions of said linkage members not covered by said top plate, and said top plate is thus recessed within one or more of said linkage members intermediate said opposite edges of said bottom plate.

5. The method of claim 3 wherein said step of affixing drive lug means further comprises the step of affixing a top plate to said elongated members and affixing at least one guide member to said top plate, said guide members being shaped for driving engagement with a drive wheel of a track vehicle.

6. The method of claim 5 further comprising the step of forming a recess in said elongated parallel members dimensioned for receiving said top plate such that said top plate lies flush with the top edges of said parallel members.

7. The method of claim 5 further comprising the step of forming a recess in one or more of said elongated members dimensioned to receive therein said top plate such that said top plate lies flush with said end portions of the elongated members.

8. A track shoe suitable for manufacture from sheet metal stock comprising:
 a bottom plate having an upper side, a lower side, two ends, and a pair of opposite edges extending between said ends;
 a plurality of elongated mutually parallel linkage members of uniform thickness, each linkage member having an inner portion and an end portion, said inner portions being secured to said bottom plate in side-by-side abutting relationship, said end portions extending alternately over opposite edges of said bottom plate;
 aligned bores formed in said end portions for receiving a hinge pin adjacent to each of said edges;
 at least one pair of brace plates secured between said bottom plate and at least one pair of said linkage members for bracing said linkage members; and,
 drive lug means secured to at least one pair of said linkage members, said drive lug means including one or more guide members engageable by a drive wheel for driving said shoe in a track.

9. A method for manufacturing a track shoe comprising the steps of:
 cutting a bottom plate having an upper side, a lower side, two ends, and a pair of opposite edges extending between said ends;
 cutting a plurality of elongated mutually parallel linkage members of uniform thickness, each linkage member having an inner portion and an end portion, said inner portions being secured to said bottom plate in side-by-side abutting relationship, said end portions extending alternately over opposite edges of said bottom plate;
 forming aligned bores formed in said end portions for receiving a hinge pin adjacent to each of said edges;
 securing at least one pair of brace plates between said bottom plate and at least one pair of said linkage members for bracing said linkage members; and,
 securing drive lug means to at least one pair of said linkage members, said drive lug means including one or more guide members engageable by a drive wheel for driving said shoe in a track.

* * * * *